(12) United States Patent
Yamaguchi

(10) Patent No.: US 9,778,552 B2
(45) Date of Patent: Oct. 3, 2017

(54) LIGHT SOURCE DEVICE AND PROJECTION DISPLAY APPARATUS

(71) Applicant: CANON KABUSHIKI KAISHA, Tokyo (JP)

(72) Inventor: Takuya Yamaguchi, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/240,349

(22) Filed: Aug. 18, 2016

(65) Prior Publication Data
US 2017/0059973 A1    Mar. 2, 2017

(30) Foreign Application Priority Data
Aug. 28, 2015 (JP) .................................. 2015-169631

(51) Int. Cl.
G03B 21/16   (2006.01)
G03B 21/20   (2006.01)

(52) U.S. Cl.
CPC ......... G03B 21/16 (2013.01); G03B 21/2033 (2013.01); G03B 21/2013 (2013.01)

(58) Field of Classification Search
CPC .. G03B 21/16; G03B 21/145; G03B 21/2013; G03B 21/2033; H01L 23/427; H01L 23/467; H01L 23/473; F21V 29/02; F21V 29/006; F21V 29/67; F21V 29/70; F21V 29/74; F21V 29/76
See application file for complete search history.

(56) References Cited

U.S. PATENT DOCUMENTS

| 8,562,143 | B2   | 10/2013 | Miyazaki |           |
|-----------|------|---------|----------|-----------|
| 2002/0135741 | A1* | 9/2002 | Lee ........................ | G03B 21/16 353/61 |
| 2005/0157269 | A1* | 7/2005 | Seto ....................... | G03B 21/16 353/61 |
| 2006/0082732 | A1* | 4/2006 | Miwa ................... | H04N 9/3144 353/57 |

FOREIGN PATENT DOCUMENTS

JP       2007-133300 A       5/2007

* cited by examiner

*Primary Examiner* — Sultan Chowdhury
(74) *Attorney, Agent, or Firm* — Canon USA, Inc., IP Division

(57) ABSTRACT

A light source device includes heat releasing fins for cooling a blue light emitting diode (LED), a red LED, and a green LED, respectively, which are located next to each other in a direction in which a cooling fan blows air. A space formed between an upper surface of an optical unit and the heat releasing fins enable cooling air of the cooling fan to pass through the space.

19 Claims, 6 Drawing Sheets

LIGHT SOURCE DEVICE AND PROJECTION DISPLAY APPARATUS

BACKGROUND

Field

Aspects of the present invention generally relate to a light source device and a projection display apparatus including the light source device.

Description of the Related Art

A projection display apparatus (projector) includes a light source device including light sources (light emitting diodes (LEDs), lasers, or lamps) for red (R), green (G), and blue (B). In such a light source device, when a light source emits light, the temperature of the light source increases.

If the temperature of a light source becomes excessively high, the lifetime of the light source can be shortened. Further, in the case where an LED is used as a light source, a rise in the temperature of the LED leads to a decrease in the amount of output light of the LED because LEDs have a sensitive light-amount characteristic with respect to the temperature. This leads to a decrease in the amount of light and a change in hues of a projection image, which leads to deterioration in image quality of the projection image. To address this, cooling mechanisms of light source devices have been discussed.

U.S. Pat. No. 8,562,143 discusses a configuration of a projection display apparatus including a plurality of light source devices for respective colors and a plurality of fans respectively corresponding to the plurality of light source devices. In this configuration, a fan and an airflow are provided to each of the light source devices. This results in an increase in the number of fans, which leads to an increase in the size of the cooling configuration.

Japanese Patent Application Laid-Open No. 2007-133300 discusses a projection display apparatus including a plurality of light source devices for respective colors and radiators (or heat pipes) respectively corresponding to the plurality of light source devices. In the configuration of the projection display apparatus discussed therein, the radiators are cooled with a single cooling fan. In this configuration, a radiator is provided to each of the light source devices, and the radiators are located separate from each other. Thus, the airflow becomes complicated, leading to frequent pressure losses, and it is difficult to realize efficiently cooling with a single cooling fan.

SUMMARY

According to an aspect of the present invention, a light source device includes a first light source located on a first surface of a support member, a first heat receiving unit configured to receive heat generated by the first light source, a first heat releasing unit configured to receive heat from the first heat receiving unit and release heat, and is located on a fourth surface of the support member, a second light source located on a second surface of the support member, a second heat receiving unit configured to receive heat generated by the second light source, a second heat releasing unit configured to receive heat from the second heat receiving unit and release heat, and is located on the fourth surface of the support member, a second heat transfer unit configured to transfer heat from the second heat receiving unit to the second heat releasing unit, and an air blowing unit configured to blow air to the first heat releasing unit and the second heat releasing unit, wherein the first heat releasing unit and the second heat releasing unit are adjacent to each other in an air-blowing direction in which the air blowing unit blows air, and wherein the second heat releasing unit and the fourth surface are separated by a space and the air blowing unit blows air into the space.

Further features of aspects of the present invention will become apparent from the following description of exemplary embodiments with reference to the attached drawings.

DESCRIPTION OF THE EMBODIMENTS

Various exemplary embodiments of the present invention will be described in detail below with reference to the drawings. It should be noted that elements described in the following exemplary embodiments are mere examples and are not intended to limit the scope of the aspects of the invention.

Configuration of Projection Display Apparatus 100

Figure 1:
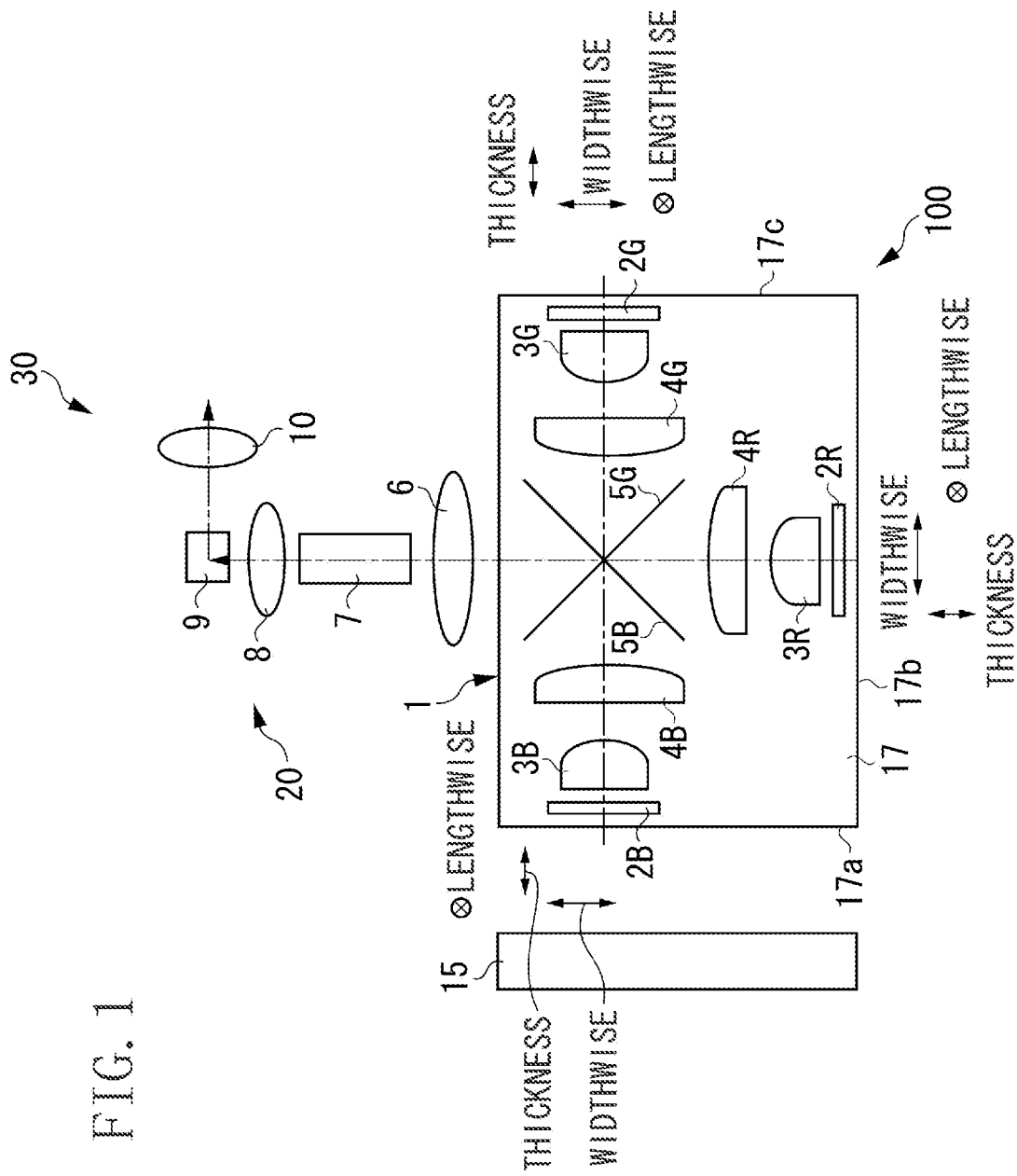
FIG. 1 illustrates a configuration of a projection display apparatus including a light source device according to an exemplary embodiment of the present invention.

FIG. 1 illustrates a configuration of a projection display apparatus 100 including a light source unit 1 according to an exemplary embodiment of the present invention. The projection display apparatus 100 used in the present exemplary embodiment includes the light source unit 1, an illumination unit 20, a projection unit 30, and a cooling fan 15 (cooling unit). The light source unit 1 and the cooling fan 15 constitute a light source device.

The light source unit 1 combines lights emitted from light emitting elements and emits the combined light. The illumination unit 20 generates a projection image based on the emitted light. The projection unit 30 projects the projection image onto a screen.

The light source unit 1, the illumination unit 20, and the projection unit 30 will be described in detail below.

Configuration of Light Source Unit 1

FIG. 1 illustrates a configuration of the projection display apparatus 100 including the light source unit 1 according to the present exemplary embodiment. The light source unit 1 includes a blue light emitting diode (LED) 2B (first light source), a red LED 2R (second light source), and a green LED 2G (third light source), which are light sources. The light source unit 1 has a substantially rectangular parallelepiped shape (refer to FIG. 5). The red LED 2R, the green LED 2G, and the blue LED 2B are supported by a frame member 17 (support member) configured to support the light sources.

The blue LED 2B is supported by a surface 17a (first surface) of the frame member 17. The red LED 2R is supported by a surface 17b (second surface) of the frame member 17. The green LED 2G is supported by a surface 17c (third surface) of the frame member 17. The external shape of each of the red LED 2R, the green LED 2G, and the blue LED 2B is 27.0 mm in a lengthwise direction, 15.5 mm in a widthwise direction, and 1.5 mm in a thickness direction.

In FIG. 1, a front-back direction with respect to the sheet is the lengthwise direction, and a direction in which light is emitted from each of the red LED 2R, the green LED 2G, and the blue LED 2B is the thickness direction. A direction that is orthogonal to the lengthwise direction and the thickness direction is the widthwise direction.

Collimator lenses 3R, 3G, 3B, 4R, 4G, and 4B and dichroic mirrors 5B and 5G are located in the respective directions of emission of light from the red LED 2R, the green LED 2G, and the blue LED 2B. The collimator lenses 3R, 3G, 3B, 4R, 4G, and 4B change light into parallel light, and the dichroic mirrors 5B and 5G combine lights. The dichroic mirrors 5B and 5G are mirrors that switch between transmission and reflection depending on the wavelength of incident light. The dichroic mirror 5B reflects blue wavelength components and transmits red wavelength components and green wavelength components. The dichroic mirror 5G reflects green wavelength components and transmits red wavelength components and blue wavelength components.

The paths of light beams emitted from the red LED 2R, the green LED 2G, and the blue LED 2B, respectively will be described below.

A light beam emitted from the red LED 2R passes through the collimator lenses 3R and 4R to become parallel light. Thereafter, the light beam is transmitted through the dichroic mirrors 5G and 5B because the dichroic mirrors 5G and 5B do not reflect red wavelength components, and red light is emitted from the light source unit 1.

A light beam emitted from the blue LED 2B passes through the collimator lenses 3B and 4B to become parallel light. Thereafter, the light beam is transmitted through the dichroic mirror 5G because the dichroic mirror 5G does not reflect blue wavelength components, and blue wavelength components are reflected by the dichroic mirror 5B to change the traveling direction by 90 degrees, whereby blue light is emitted from the light source unit 1.

A light beam emitted from the green LED 2G passes through the collimator lenses 3G and 4G to become parallel light. Thereafter, the light beam is transmitted through the dichroic mirror 5B because the dichroic mirror 5B does not reflect green wavelength components, and only green wavelength components are reflected by the dichroic mirror 5G to change the traveling direction by 90 degrees, whereby green light is emitted from the light source unit 1.

In this way, the dichroic mirrors 5G and 5B each function as a combining unit to combine the red light, the green light, and the blue light together. The combined light is emitted from the light source unit 1.

Configurations of Illumination Unit 20 and Projection Unit 30

The projection display apparatus 100 includes the illumination unit 20 and the projection unit 30 for displaying an image based on light emitted from the light source unit 1. The illumination unit 20 includes a condenser lens 6, a rod integrator 7, a relay lens 8, and a digital micro-mirror device (DMD) panel 9. The projection unit 30 includes a projection lens 10.

The condenser lens 6 condenses the light combined by the dichroic mirrors 5B and 5G. The rod integrator 7 receives the light condensed by the condenser lens 6 and repeats total internal reflection of the light so that the illuminance distribution at an outlet becomes uniform. The relay lens 8 outputs the incident light from the rod integrator 7 to the DMD panel 9. The DMD panel 9 changes the tilt of a micro-mirror with respect to the incident light based on image signals to be projected, whereby reflection is conducted while the state (ON state) in which light is reflected toward the projection side and the state (OFF state) in which light is reflected toward an absorbing member are switched. The brightness and tint of an image to be projected onto a projection surface are controlled by the time ratio between the ON state and the OFF state.

Configuration of Cooling Mechanism of Light Source Unit 1

A cooling mechanism of the light source unit 1 will be described with reference to FIGS. 2 to 5. The red LED 2R, the green LED 2G, and the blue LED 2B include heat releasing members 11R, 11G, and 11B, respectively.

Figure 2:
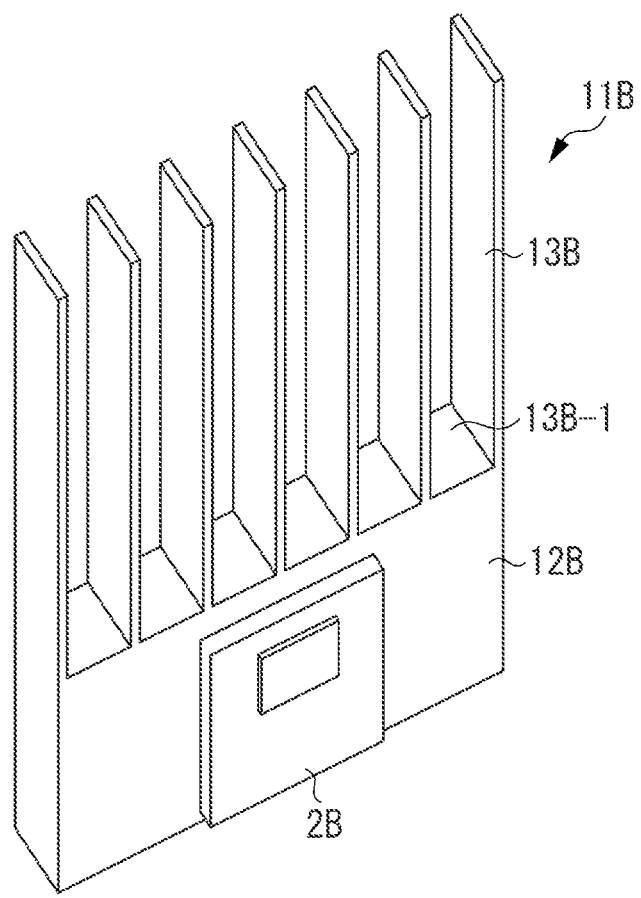
FIG. 2 is a perspective view illustrating a blue light emitting diode (LED) and a heat releasing member.
Figure 2:
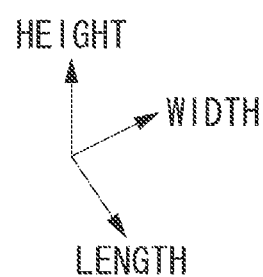

FIG. 2 is a perspective view illustrating the blue LED 2B and the heat releasing member 11B. The heat releasing member 11B is formed by a heat receiving unit 12B (first heat receiving unit) and a heat releasing fin 13B (first heat releasing unit). The heat releasing fin 13B and the heat receiving unit 12B are connected to each other at an end portion 13B-1 of the heat releasing fin 13B. The heat receiving unit 12B and the heat releasing fin 13B are made of copper. A heat releasing surface of the blue LED 2B is in contact with the heat receiving unit 12B of the heat releasing member 11B via a heat transfer sheet (not illustrated).

The size of the heat releasing fin 13B is 6.8 mm (length)× 40.4 mm (width)×60.0 mm (height), where the length direction is the thickness direction of the blue LED 2B, the width direction is the widthwise direction of a light emitting surface of the blue LED 2B, and the height direction is the lengthwise direction of the blue LED 2B. The thickness of the fin is 0.8 mm.

How heat is transferred will be described below.

When the blue LED 2B emits light, heat is generated. The generated heat is transferred from the heat releasing surface of the blue LED 2B to the heat receiving unit 12B and the heat releasing fin 13B and then released from the heat releasing fin 13B.

Figure 3:
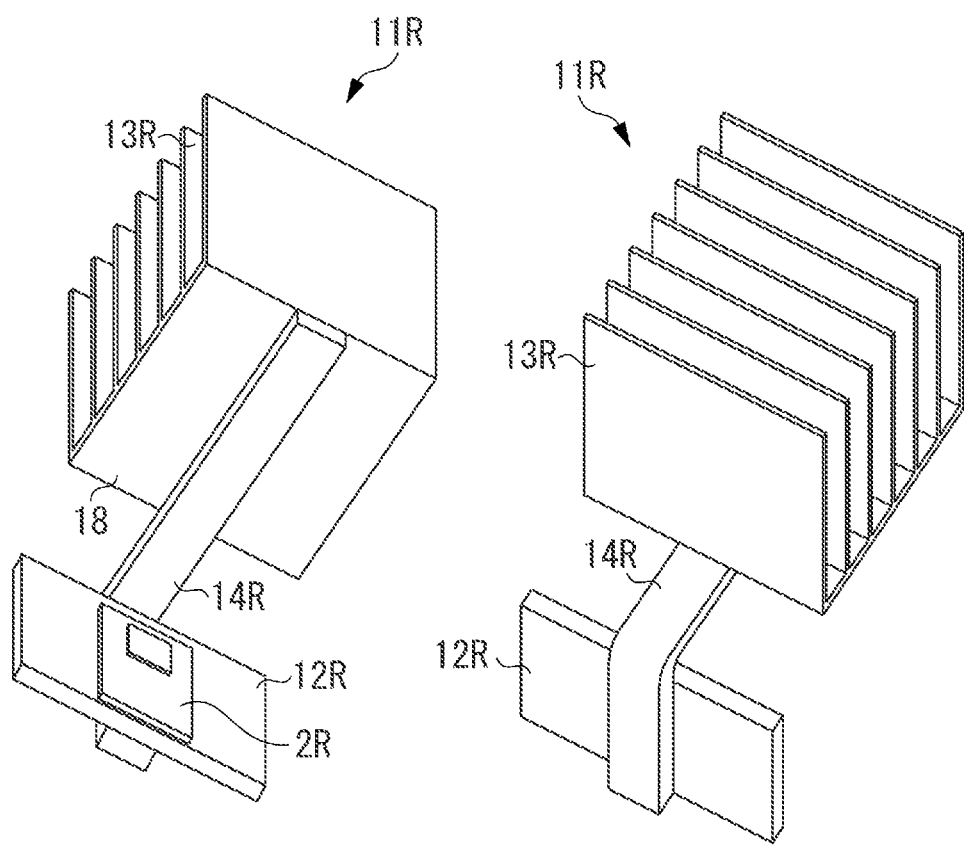
FIG. 3 is a perspective view illustrating a red LED and a heat releasing member.

FIG. 3 is a perspective view illustrating the red LED 2R and the heat releasing member 11R. The heat releasing member 11R includes a heat receiving unit 12R (second heat receiving unit), a heat pipe 14R (second heat transfer unit), and a heat releasing fin 13R (second heat releasing unit). The heat receiving unit 12R and the heat releasing fin 13R are located separate from each other, but are connected to each other by the heat pipe 14R. A base portion 18 configured to support the heat releasing fin 13R is fixed to a casing (frame) of the light source unit 1 to face a top surface 17d (fourth surface) of the light source unit 1 with a predetermined distance.

The heat pipe 14R is manufactured by evacuating a pipe made of copper to create a vacuum in the pipe and then filling the pipe with water as a cooling medium. The heat receiving unit 12R and the heat releasing fin 13R are made of copper.

A heat releasing surface of the red LED 2R is in contact with the heat receiving unit 12R via a heat transfer sheet (not illustrated).

The size of the heat releasing fin 13R is 40.2 mm (length)×40.4 mm (width)×49.0 mm (height), where the length direction is the thickness direction of the blue LED 2B, the width direction is the widthwise direction of a light emitting surface of the blue LED 2B, and the height direction is the lengthwise direction of the blue LED 2B. The thickness of the fin is 0.8 mm.

How heat is transferred will be described below. When the red LED 2R emits light, heat is generated. The generated heat is transferred from the heat releasing surface of the red LED 2R to the heat receiving unit 12R, the heat pipe 14R, and the heat releasing fin 13R and then released from the heat releasing fin 13R.

Figure 4:
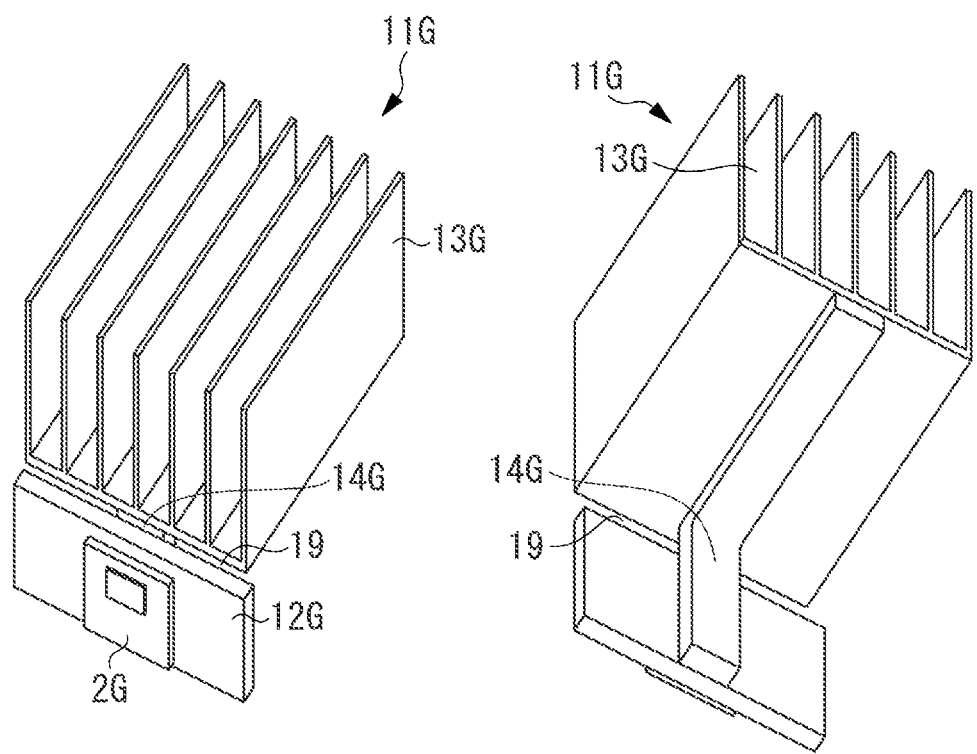
FIG. 4 is a perspective view illustrating a green LED and a heat releasing member.

FIG. 4 is a perspective view illustrating the green LED 2G and the heat releasing member 11G. The heat releasing member 11G includes a heat receiving unit 12G (third heat receiving unit), a heat pipe 14G (third heat transfer unit), and a heat releasing fin 13G (third heat releasing unit). The heat receiving unit 12G and the heat releasing fin 13G are located separate from each other, but are connected to each other by the heat pipe 14G. The heat releasing member 11G is fixed to the casing of the light source unit 1.

The heat pipe 14G is manufactured by evacuating a pipe made of copper to create a vacuum in the pipe and then filling the pipe with water as a cooling medium. The heat receiving unit 12G and the heat releasing fin 13G are both made of copper.

A heat releasing surface of the green LED 2G is in contact with the heat receiving unit 12G via a heat transfer sheet (not illustrated).

The size of the heat releasing fin 13G is 50.0 mm (length)×40.4 mm (width)×49.0 mm (height), where the length direction is the thickness direction of the blue LED 2B, the width direction is the widthwise direction of a light emitting surface of the blue LED 2B, and the height direction is the lengthwise direction of the blue LED 2B. The thickness of the fin is 0.8 mm.

How heat is transferred will be described below. When the green LED 2G emits light, heat is generated. The generated heat is transferred from the heat releasing surface of the green LED 2G to the heat receiving unit 12G, the heat pipe 14G, and the heat releasing fin 13G and then released from the heat releasing fin 13G.

Figure 5:
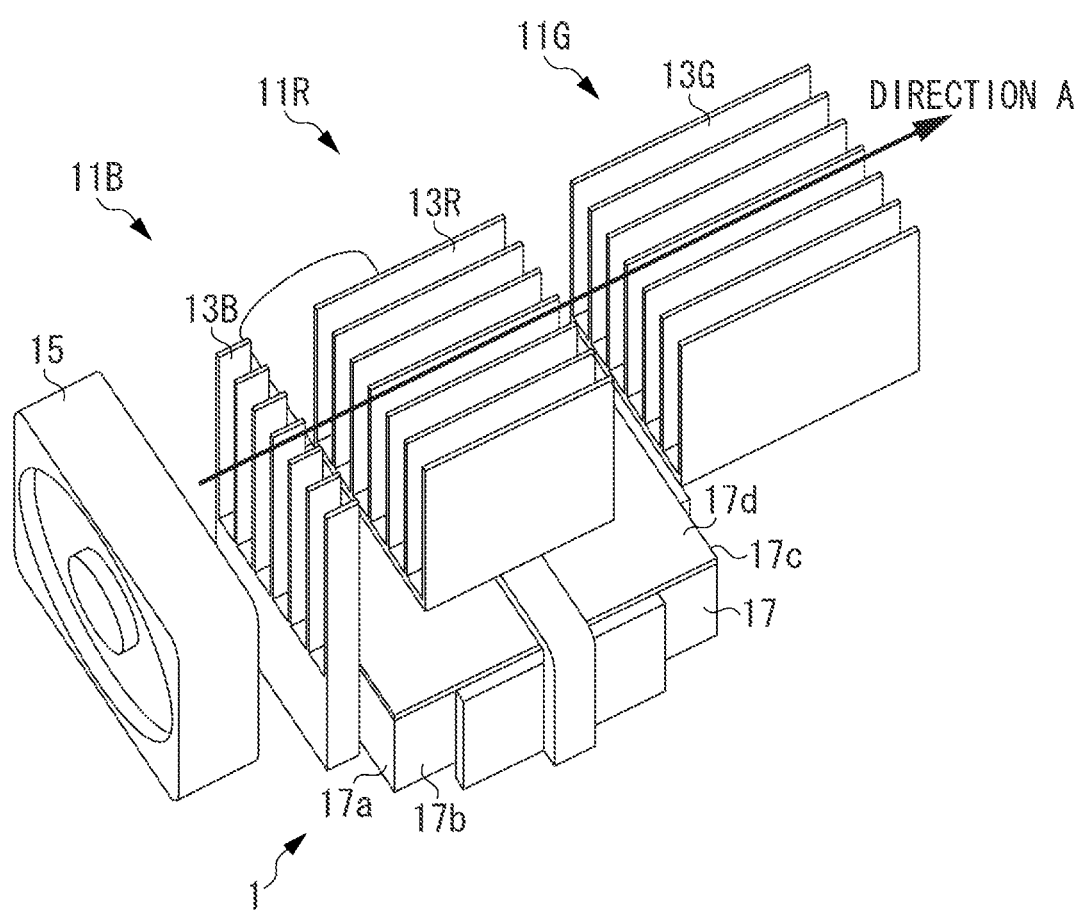
FIG. 5 is a perspective view illustrating a cooling mechanism in a state in which LEDs of three colors and heat releasing members are mounted.

FIG. 5 is a perspective view illustrating the cooling mechanism in the state in which the LEDs of three colors and the heat releasing members are mounted. The heat releasing fins 13B, 13R, and 13G of the respective colors are located with the heat pipes on the top surface 17d side. The cooling fan 15 is located in front of the heat releasing member 11B. The cooling fan 15 is an axial fan and has a length of 92 mm, a width of 92 mm, and a thickness of 25 mm. The cooling fan 15 blows air in a direction A specified in FIG. 5. The heat releasing member 11R is located downstream of the heat releasing member 11B, and the heat releasing members 11B and 11R are located on a substantially straight line in the direction in which the cooling fan 15 blows air.

The heat releasing member 11G is located downstream of the heat releasing member 11R, and the heat releasing members 11B, 11R, and 11G are located on a substantially straight line in the direction in which the cooling fan 15 blows air. The directions of the heat releasing fins 13B, 13R, and 13G are substantially the same as the direction in which air is blown. Specifically, a surface of the heat releasing fin 13 in the shape of a flat plate is substantially parallel to the direction in which air is blown. The heat releasing members 11B, 11R, and 11G and the cooling fan 15 are surrounded by a duct (not illustrated), and air is taken in from an upstream part of the cooling fan 15, cools the heat releasing members 11B, 11R, and 11G in this order, and is then discharged.

The foregoing cooling configuration enables cooling of the heat releasing members 11R, 11G, and 11B without bending an air blowing path of the cooling fan 15 so that the pressure loss in the air blowing path can be reduced. Since the heat releasing members 11B, 11R, and 11G can be located on one straight line to be cooled, the cooling is realized with a compact configuration.

Cooling of Top Surface 17d of Light Source Unit 1

Figure 6:
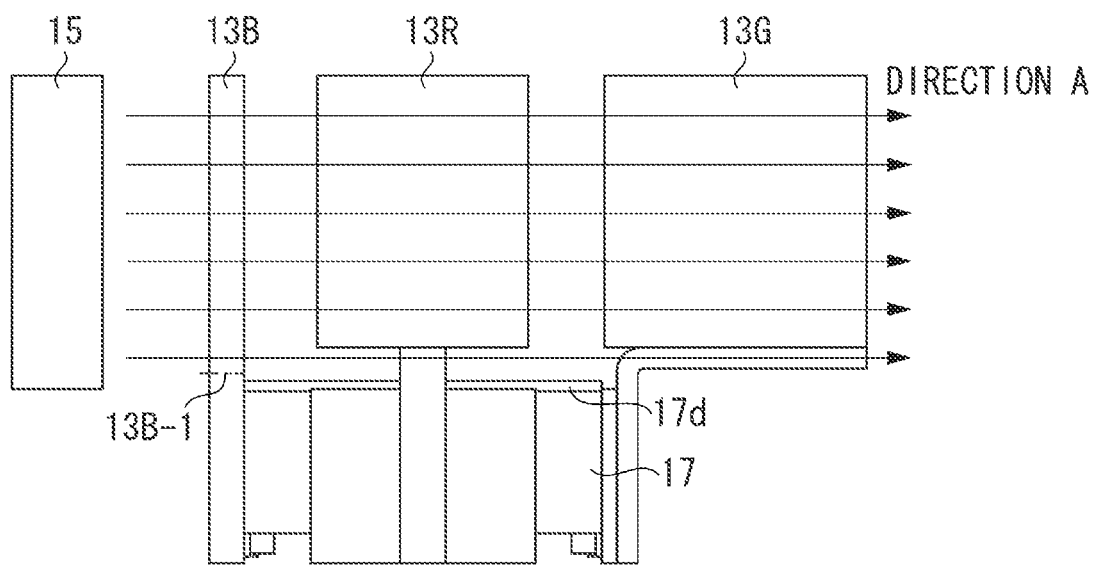
FIG. 6 is a side view illustrating a cooling mechanism.

As described above, the red LED 2R, the green LED 2G, and the blue LED 2B are actively cooled from the heat releasing surface side via the heat releasing members 11R, 11G, and 11B. However, the red LED 2R, the green LED 2G, and the blue LED 2B are not actively cooled from the light emitting surface side, so that heat sometimes remains in the light source unit 1. FIG. 6 is a side view illustrating the cooling mechanism. The cooling fan 15 blows air in the direction A (air-blowing direction) specified in FIG. 6. There is a space between the heat releasing fin 13R and the top surface 17d of the light source unit 1, and cooling air having passed through the heat releasing fin 13B can cool the top surface 17d while cooling the heat releasing fin 13R.

To allow the cooling air to reach the space between the heat releasing fin 13R and the top surface 17d of the light source unit 1, the end portion 13B-1 of the heat releasing fin 13B is located on a side closer to the heat receiving unit 12B than the top surface 17d. Heat in the light source unit 1 is transferred to the top surface 17d and cooled by the cooling air. The cooling air having passed through the top surface 17d passes through a part below the heat releasing fin 13G or the inside of the heat releasing fin 13G to be discharged. To allow the cooling air to pass through the part below the heat releasing fin 13G, a space is formed between the heat releasing fin 13G and the heat receiving unit 12G (refer to FIG. 4). The foregoing configuration enables the inside of the light source unit 1 to be cooled. The cooling air of the cooling fan 15 can be arranged to be applied to not only the heat releasing fin 13B but also the heat receiving unit 12B to directly cool a part of the heat receiving unit 12B.

Order of Cooling Light Source Unit

The red LED 2R used in the present exemplary embodiment has a forward voltage of 3.3 V and a peak current value of 12 A. The green LED 2G has a forward voltage of 3.55 V and a peak current value of 12 A, and the blue LED 2B has a forward voltage of 3.55 V and a peak current value of 12 A. A single chip digital micro-mirror device (DMD) method is employed, and backlights of the LEDs of three colors are sequentially lit at different times by a field sequential method.

As to the lighting duty of each color, the red LED 2R, the green LED 2G, and the blue LED 2B are used at 27%, 60%, and 13%, respectively. Accordingly, the power consumptions Wr, Wg, and Wb of the red LED 2R, the green LED 2G, and the blue LED 2B, respectively, are as follows:

The power consumption Wr of the red LED 2R=3.3×12× 0.27=10.7 [W].

The power consumption Wg of the green LED 2G=3.55× 12×0.60=25.6 [W].

The power consumption Wb of the blue LED 2B=3.55× 12×0.13=5.5 [W].

Meanwhile, the luminous efficiencies of the red LED 2R, the green LED 2G, and the blue LED 2B are 24%, 13%, and 18%, respectively. Accordingly, the heat generation amounts Qr, Qg, and Qb of the red LED 2R, the green LED 2G, and the blue LED 2B, respectively, are as follows:

The heat generation amount Qr of the red LED 2R=10.7× (1−0.24)=8.1 [W].

The heat generation amount Qg of the green LED 2G=25.6×(1−0.13)=22.3 [W].

The heat generation amount Qb of the blue LED 2B=5.5× (1−0.18)=4.5 [W].

According to the foregoing results, the heat generation amount Qg of the green LED 2G, the heat generation amount Qr of the red LED 2R, and the heat generation amount Qb of the blue LED 2B decrease in this order. In the present exemplary embodiment, the cooling fan 15 cools the blue LED 2B, the red LED 2R, and the green LED 2G in this order. Specifically, the LED 2 with a smaller heat generation amount is located upstream in the direction in which the cooling fan 15 blows air, and the LED 2 with a larger heat generation amount is located downstream in the direction in which the cooling fan 15 blows air. In this way, warmed cooling air having passed through the green LED 2G, which has a large heat generation amount, is not used to cool the LEDs of the other colors. This arrangement enables efficient cooling of the LEDs of the respective colors. Further, the lengths of the heat releasing fins 13 in the direction in which the cooling fan 15 blows air are set as follows:

heat releasing fin 13B for blue<heat releasing fin 13R for red<heat releasing fin 13G for green.

At downstream sides in the direction in which air is blown, the cooling air is warmer and the heat generation amount of the LED 2 is larger, so the length of the heat releasing fin is set longer to increase the amount of heat to be released. In this way, the LEDs can be cooled sufficiently, and the distance of the entire cooling air path can be shortened.

While the heat pipe 14R is used to transfer heat from the heat receiving unit 12R to the heat releasing fin 13R of the red LED 2R in the present exemplary embodiment, a component in which the heat receiving unit 12R to the heat releasing fin 13R are integrated can be used without using the heat pipe 14R. Similarly, while the heat pipe 14G is used to transfer heat from the heat receiving unit 12G to the heat releasing fin 13G of the green LED 2G, a heat releasing fin in which the heat receiving unit 12G to the heat releasing fin 13G are integrated can be used without using the heat pipe 14G. While the integrated heat releasing fin 13B is used to transfer heat from the heat receiving unit 12B of the blue LED 2B to the heat releasing unit, a heat pipe can be used as a heat transfer unit between the heat receiving unit 12B and the heat releasing fin 13B.

In the present exemplary embodiment, the example is described where the heat generation amounts of the blue LED 2B, the red LED 2R, and the green LED 2G increase in this order. In this example, the respective heat releasing fins 13 of the blue LED 2B, the red LED 2R, and the green LED 2G are located in this order, and the size of the heat releasing fins 13 is increased at a larger heat generation amount. However, the configuration is not limited thereto. In a case where the heat generation amounts of the red LED, the blue LED, and the green LED increase in this order, the heat releasing fins 13 can be located in this order, and the sizes of the heat releasing fins 13 can be increased in this order. Further, while three LEDs are considered in the present exemplary embodiment, the configuration is not limited thereto. A relationship between at least two heat releasing fins 13 can be considered. For example, the red LED 2R and the green LED 2G can be considered. In this case, the red LED 2R is a second light source, the green LED 2G is a first light source, the heat receiving unit 12R is a second heat receiving unit, the heat receiving unit 12G is a first heat receiving unit, the heat releasing fin 13R is a second heat releasing unit, and the heat releasing fin 13G is a first heat releasing unit.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-169631, filed Aug. 28, 2015, which is hereby incorporated by reference herein in its entirety.

What is claimed is:

1. A light source device comprising:
a first light source located on a first surface of a support member;
a first heat receiving unit configured to receive heat generated by the first light source;
a first heat releasing unit configured to receive heat from the first heat receiving unit and release the heat, the first heat releasing unit located on a fourth surface of the support member;
a second light source located on a second surface of the support member;
a second heat receiving unit configured to receive heat generated by the second light source;
a second heat releasing unit configured to receive heat from the second heat receiving unit and release the heat, the second heat releasing located on the fourth surface of the support member;
a second heat transfer unit configured to transfer heat from the second heat receiving unit to the second heat releasing unit; and
an air blowing unit configured to blow air to the first heat releasing unit and the second heat releasing unit,
wherein the first heat releasing unit and the second heat releasing unit are adjacent to each other in an air-blowing direction in which the air blowing unit blows air, and
wherein the second heat releasing unit and the fourth surface are separated by a space, and the air blowing unit blows air into the space.

2. The light source device according to claim 1,
wherein the first heat releasing unit includes a first heat releasing fin,
wherein the second heat releasing unit includes a second heat releasing fin, and
wherein the first heat releasing fin and the second heat releasing fin are located in the air-blowing direction from the air blowing unit.

3. The light source device according to claim 1,
wherein the second heat releasing unit includes a second heat releasing fin and a base portion configured to support the second heat releasing fin, the base portion facing the fourth surface and separated from the fourth surface by a predetermined distance to form the space, and
wherein the air blowing unit blows air to cool the base portion and the fourth surface.

4. The light source device according to claim 1,
wherein the first heat releasing unit is located upstream of the second heat releasing unit in the air-blowing direction, and
wherein a heat generation amount of the first light source is smaller than a heat generation amount of the second light source.

5. The light source device according to claim 4,
wherein the first heat releasing unit includes a first heat releasing fin,
wherein the second heat releasing unit includes a second heat releasing fin, and
wherein a length of the second heat releasing fin in the air-blowing direction is longer than a length of the first heat releasing fin in the air-blowing direction.

6. The light source device according to claim 4,
wherein the first light source is a blue light source and the second light source is a red light source.

7. The light source device according to claim 1,
wherein the first heat releasing unit is located upstream of the second heat releasing unit in the air-blowing direction, and
wherein the first heat releasing unit includes a first heat releasing fin and wherein an end portion of the first heat releasing fin is located on a side closer to the first heat receiving unit than the fourth surface.

8. The light source device according to claim 1,
wherein the first heat releasing unit is located downstream of the second heat releasing unit in the air-blowing direction, and
wherein a heat generation amount of the first light source is larger than a heat generation amount of the second light source.

9. The light source device according to claim 8,
wherein the first heat releasing unit includes a first heat releasing fin,
wherein the second heat releasing unit includes a second heat releasing fin, and
wherein a length of the second heat releasing fin in the air-blowing direction is shorter than a length of the first heat releasing fin in the air-blowing direction.

10. The light source device according to claim 8,
wherein the first light source is a green light source and the second light source is a red light source.

11. The light source device according to claim 1, further comprising a first heat transfer unit configured to transfer heat from the first heat receiving unit to the first heat releasing unit,
wherein a location of the first heat transfer unit forms a space between the first heat releasing unit and the first heat receiving unit.

12. The light source device according to claim 1, wherein the second heat transfer unit is a heat pipe.

13. A light source device comprising:
a first light source located on a first surface of a support member;
a first heat receiving unit configured to receive heat generated by the first light source;
a first heat releasing unit configured to receive heat from the first heat receiving unit and release the heat, the first heat releasing unit located on a fourth surface of the support member;
a second light source located on a second surface of the support member;
a second heat receiving unit configured to receive heat generated by the second light source;
a second heat releasing unit configured to receive heat from the second heat receiving unit and release the heat, the second heat releasing unit located on the fourth surface of the support member;
a second heat transfer unit configured to transfer heat from the second heat receiving unit to the second heat releasing unit;
a third light source located on a third surface of the support member;
a third heat receiving unit configured to receive heat generated by the third light source;
a third heat releasing unit configured to receive heat from the third heat receiving unit and release the heat, the third heat releasing unit located on the fourth surface of the support member; and
an air blowing unit configured to blow air to the first heat releasing unit, the second heat releasing unit, and the third heat releasing unit,
wherein the first heat releasing unit, the second heat releasing unit, and the third heat releasing unit are adjacent to each other in an air-blowing direction in which the air blowing unit blows air, and
wherein the second heat releasing unit and the fourth surface are separated by a space, and the air blowing unit blows air into the space.

14. The light source device according to claim 13,
wherein the first heat releasing unit is located upstream of the second heat releasing unit in the air-blowing direction,
wherein the third heat releasing unit is located downstream of the second heat releasing unit in the air-blowing direction, and
wherein the first heat releasing unit includes a first heat releasing fin, and wherein an end portion of the first heat releasing fin is located on a side closer to the first heat receiving unit than the fourth surface.

15. The light source device according to claim 14,
wherein the first heat releasing unit includes a first heat releasing fin,
wherein the second heat releasing unit includes a second heat releasing fin,
wherein the third heat releasing unit includes a third heat releasing fin,
wherein a length of the second heat releasing fin is longer than a length of the first heat releasing fin, and
wherein a length of the third heat releasing fin in the air-blowing direction is longer than the length of the second heat releasing fin in the air-blowing direction.

16. The light source device according to claim 14, further comprising a third heat transfer unit configured to transfer heat from the third heat receiving unit to the third heat releasing unit,
wherein the third heat transfer unit is provided to form a space between the third heat releasing unit and the third heat receiving unit.

17. The light source device according to claim 13,
wherein the first heat releasing unit is located upstream of the second heat releasing unit in the air-blowing direction,
wherein the third heat releasing unit is located downstream of the second heat releasing unit in the air-blowing direction,
wherein a heat generation amount of the first light source is larger than a heat generation amount of the second light source, and wherein a heat generation amount of the third light source is smaller than the heat generation amount of the second light source.

18. A projection display apparatus comprising:

the light source device according to claim 1;

an illumination unit configured to generate a projection image based on light emitted from the light source device; and a projection unit configured to project the projection image.

19. A projection display apparatus comprising:

the light source device according to claim 12;

an illumination unit configured to generate a projection image based on light emitted from the light source device; and a projection unit configured to project the projection image.

* * * * *